Jan. 8, 1957   F. H. MUELLER ET AL   2,776,798
RELIEF VALVE
Filed Nov. 5, 1951   2 Sheets-Sheet 1
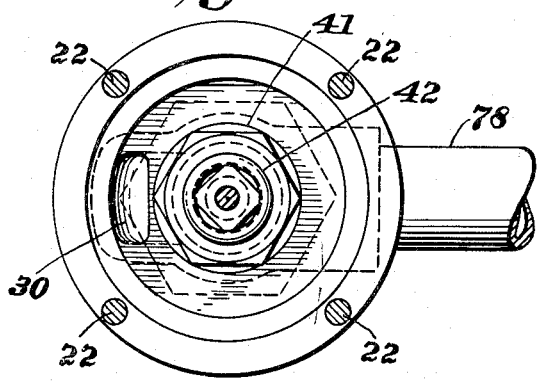
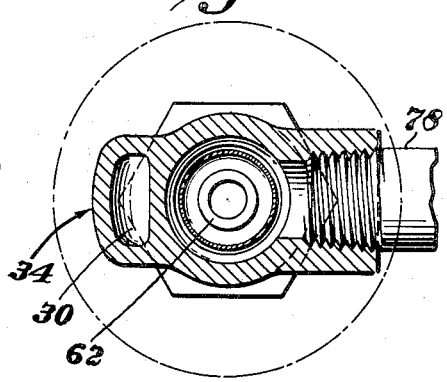
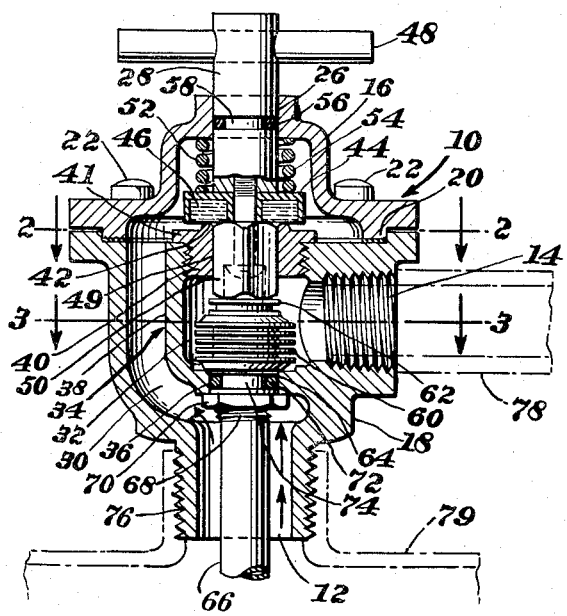
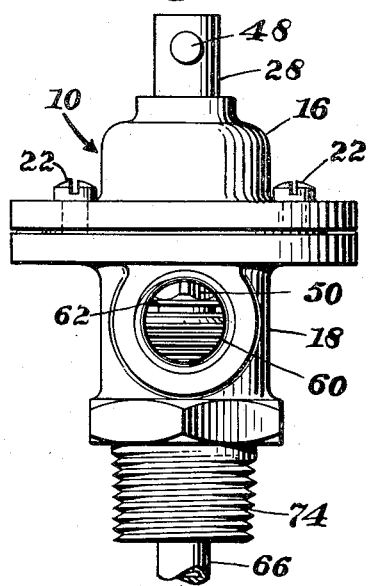
INVENTORS:
Frank H. Mueller,
Earl E. Tinker,
BY Cushman, Darby & Cushman
ATTORNEYS.

Jan. 8, 1957  F. H. MUELLER ET AL  2,776,798
RELIEF VALVE
Filed Nov. 5, 1951  2 Sheets-Sheet 2

INVENTORS:
Frank H. Mueller,
Earl E. Tinker,
BY Cushman, Darby & Cushman
ATTORNEYS.

United States Patent Office 2,776,798
Patented Jan. 8, 1957

2,776,798

RELIEF VALVE

Frank H. Mueller and Earl E. Tinker, Decatur, Ill., assignors to Mueller Co., Decatur, Ill., a corporation of Illinois Application November 5, 1951, Serial No. 254,858

2 Claims. (Cl. 236—93)

The present invention relates to a new and improved relief valve for fluid supplying heating systems and the like. More particularly, the present invention relates to a relief valve of the "automatic" or "re-seating" type.

In valves of the type with which this invention is concerned, it has been found that the commonly used beaded valve seat, when used in conjunction with a composition washer member on the valve provides the most positive and efficient seating arrangement as long as the seat and composition member are kept free and clean of foreign matter. The ability of this type valve to keep itself free from foreign matter is greatly reduced if the seat becomes embedded into the washer as the valve is moved to its closed position. It has been found that very little embedding of the composition washer on its seat will take place if the closing force or pressure is equal to or only slightly in excess of the force required to effect a pressure seal.

In a valve providing temperature relief, embedding of the seat is doubly objectionable. It not only increases the tendency to trap foreign matter on the seating surface, but also permits the valve seat to change its position and hence modifies the temperature at which the valve is set to relieve. Furthermore, the elevated temperatures to which such a valve must necessarily be subjected increase the tendency to embed in the valve washer. Over a period of time it will be appreciated that continuous embedding of the valve might even prevent the valve from being properly seated.

Accordingly, therefore, an important object of the present invention is to provide a relief valve having a contacting surface of suitable durable composition material and which is arranged to be moved into contact with a beaded valve seat so as to provide an effective seal, but without danger of being severely embedded in the seat.

A still further important object is to provide a quick opening relief valve of the automatic or reseating type which is more positive and accurate in operation than valves heretofore in use, and which permits complete replacement of all the working parts through the top of the valve body without removing the valve from the tank, boiler or other fluid heating system with which it is associated.

A still further object is to provide a valve wherein the depending portion of the thermal element is prevented from moving downwardly into the tank, boiler or other fluid system with which it is associated in order to obviate the possibility of the thermal element striking an obstruction which would prevent or seriously hinder the operation of the valve for relief purposes.

A further object is to provide a positive, quick acting relief valve wherein the valve member is disposed in the inlet chamber of the valve with the thermal responsive bellows being disposed in the outlet chamber away from contact with the fluid in the system, and with the valve member being so constructed as to prevent the fluid pressure in the inlet chamber from acting on the entire upper surface of the valve so as to thereby avoid excessive embedding of the composition washer caused by the pressure of the system.

Further objects and advantages of the invention will become apparent from the following description and claims.

Referring to the drawings in which is shown several preferred embodiments of the invention:

Figure 1 is a vertical sectional view of the relief valve constructed in accordance with the present invention.

Figure 2 is a sectional plan view of the valve shown in Figure 1 taken substantially along the line 2—2 of Figure 1.

Figure 3 is a sectional view taken substantially along the line 3—3 of Figure 1.

Figure 4 is an end view of Figure 1.

Figure 6:
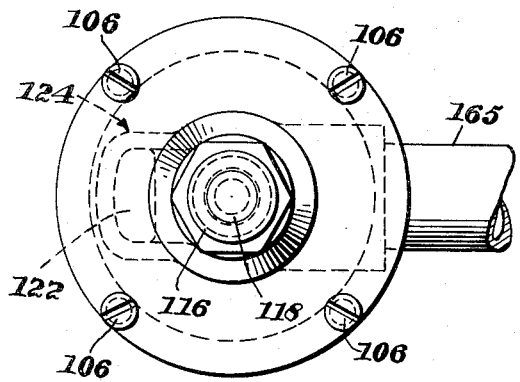
Figure 6 is a top plan view of the modification shown in Figure 5.
Figure 7:
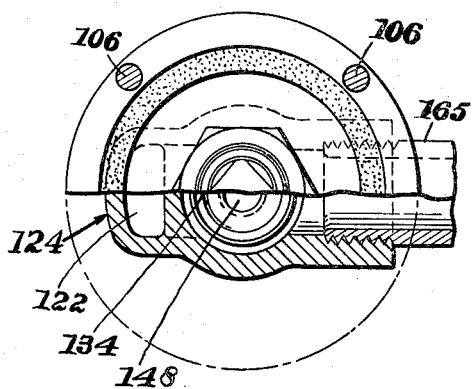
Figure 7 is a plan view partly in section of the valve shown in Figure 5 with the bonnet portion removed.

Referring to the drawings in more detail, 10 generally designates a valve housing or body of suitable size and shape and which is provided with the lower inlet opening 12 and the outlet opening 14. Valve housing 10 is composed of the two sections 16 and 18. Upper bonnet section 16 is provided with a depending circular flange 20 which seats against a complementary surface on the upper face of the lower section 18, with the two parts being held together by the bolts 22. Upper bonnet portion 16 is provided with opening 26 communicating with the atmosphere through which the valve stem 28 passes.

The interior of the valve housing 10 is divided into an inlet chamber 30 and an outlet chamber 32 by means of an inner partition 34, which is composed of a lower transverse portion 36 and a vertical section 38 which is spaced from the adjacent wall of the valve housing in order to provide the inlet passage 30. The vertical portion 38 of inner partition 34 terminates adjacent the undersurface of the valve bonnet portion 16, and has its inner diameter threaded to receive the valve seat ring 40. Valve seat ring 40 is provided with the upper flange 41 which acts to limit the distance which seat ring 40 may be screw threaded within the partition opening, so that the seat ring may not be inserted too deeply. Seat ring 40 is provided with the upstanding beaded portion 42 upon which the valve member rests in its normally seated position.

Valve member 44 is disposed within the upper portion of the inlet chamber 30 formed by the bonnet or cap portion 16. Valve member 44 is recessed on its undersurface to receive the valve composition washer 46. Valve stem 28 is secured to the upper surface of valve 44, and extends upwardly through the opening 26 in the bonnet portion 16, and is provided with the cross member 48, so that stem 28 and attached valve 44 may be manually lifted for test purposes.

Valve 44 is provided with the polygonal guide member 50 which extends downwardly through the valve opening 49 formed in the valve seat ring 40, to provide communication between the inlet chamber 30 and the outlet chamber 32, so as to permit fluid to be discharged upon unseating of valve 44. Guide member 50 is secured to valve 44 by means of the bolt 52 which extends through valve 44 and into the stem portion 28. The manner in which the guide member 50 is secured also aids in keeping the composition washer 46 in position.

A coil spring 54 surrounds the valve stem 28 between the upper surface of valve 44 and the inner surface of valve bonnet 16. In order to unseat valve 44 for relief purposes, the temperature responsive element must overcome the force of spring 54 which tends to normally maintain valve 44 in its seated position against the bead 42 of the valve seat ring 40.

Valve 44 and valve stem 28 are axially slidable and are raised bodily upwardly when valve 44 is unseated by the temperature responsive element. In order to prevent leakage of fluid through the opening 26 in the bonnet portion 16, a sliding seal member 56 is disposed within the recessed portion 58 of the stem 28. Seal member 56 is preferably of the O-ring type and contacts the inner wall of the opening 26 in bonnet 16 to prevent leakage of fluid from the system.

Outlet chamber 32 has the temperature responsive bellows 60 disposed therein. Bellows 60 is provided with the upstanding boss 62 which contacts the lower surface of the guide member 50 in response to the expansion of bellows 60.

Transverse portion 36 of the inner partition 34 is provided with a lower opening 64 which is aligned with the upper valve opening 49. The depending tubular extension 66 is integral with bellows 60 and extends beneath the bellows through the opening 64 into the inlet chamber 30. The tubular extension 66 is externally threaded as at 68 to receive the locking nut 70 which holds the bellows 60 and integral extension 66 rigidly in fixed position, as seen in Fig. 1.

In order to prevent leakage of fluid from inlet chamber 30 through the lower opening 64, a fixed seal 72, which may also be of the O-ring type, fits into the recess 74 of the tubular extension 66 and makes sealing contact between the inner diameter of the opening 64 and the tubular extension 66. Extension 66 may be of such length as to extend into the fluid tank or the like in connection with which it is to be used with its lower end being given a fluid tight seal by means of crimping or the like.

In operation, valve housing 10 is secured to the tank or system in connection with which it is to be used by means of the depending threaded neck portion 76. Due to the fact that tubular portion 66 is rigidly mounted, movement of this member downwardly under the influence of elevated temperature is not possible and, therefore, adjacent possible obstructions in the tank or system need cause no concern.

Bellows 60 and extension 66 are filled with heat expansible fluid which has free movement throughout the bellows 60 and extension 66, so that the heat from the inlet chamber 30, through which the tubular portion 66 extends, will be transmitted to the bellows 60. When the temperature of the fluid within inlet chamber 30 reaches a predetermined point, the fluid within bellows 60 and extension 66 will be expanded to a degree sufficient to cause upward expansion of bellows 60 and boss 62. This upward expansion then moves valve guide member 50 and the associated valve 44 to unseat the valve and permit waste of fluid from the inlet chamber 30 to the outlet chamber 32 through the valve opening 49 around the channels formed by the ribs on guide member 50. The waste fluid may be carried off by means of the discharge pipe 78 shown in broken lines in Figure 1, which may be threaded into outlet opening 14.

The position of the bellows 60 and its associated boss 62 in the outlet chamber 32 prevents the delicate bellows structure from having contact with the heated and often corrosive fluid in the inlet chamber, and protects the bellows from contact with foreign matter entrained in the system fluid. The disposition of the bellows beneath the valve opening also acts to deflect the waste fluid to the discharge opening 14.

It should also be noted at this point, that in the form of valve shown in Figures 1 to 4 valve 44 is subjected only to the loading force of spring 54 when in stock and when installed in the system. The construction of the valve 44 with its associated stem 28 provides a substantially equal top and bottom surface area of the valve 44 which will have contact with the fluid pressure of the system, so that serious embedding of the valve washer 46 under conditions of elevated system pressure is prevented. This arrangement provides a substantial pressure balance on valve 44 at all pressures to which the valve may be subjected when in use.

In the modification shown in Figures 5 to 8, a valve is shown which is substantially the same as that described in connection with Figures 1 to 4, with the exception that the valve structure is so modified as to provide both temperature and pressure relief where a valve of such wider application is desired.

Figure 5:
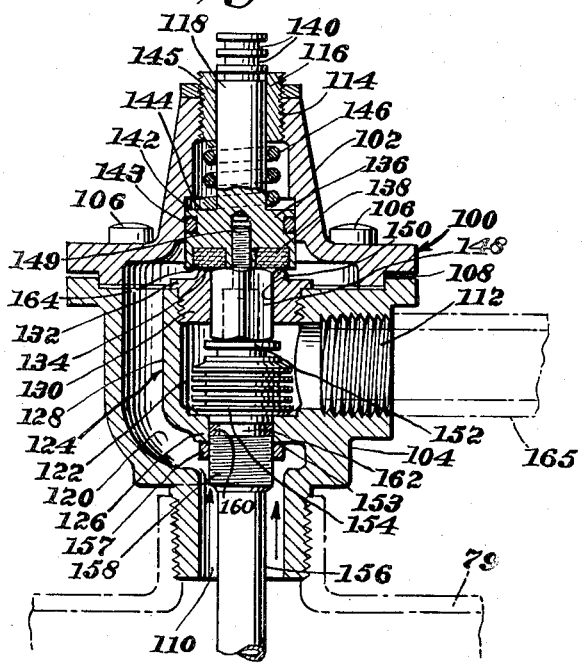
Figure 5 is a vertical sectional view of a modified form of the invention.
Figure 8:
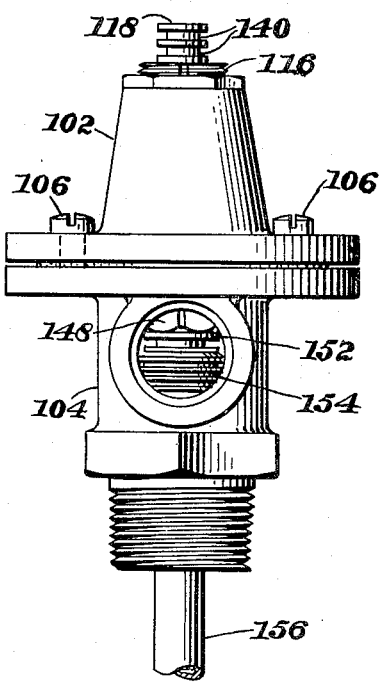
Figure 8 is an end view of the valve shown in Figure 5.

Referring to Figure 5, a valve housing, generally indicated at 100, is shown having the upper bonnet section 102 and the lower body section 104. The sections 102 and 104 are joined together by means of the securing bolts 106, with the depending flange portion 108 of the bonnet 102 being seated against a complementary recess in the upper face of the lower housing section 104.

The valve housing 100 is provided with the inlet opening 110 and outlet port 112. Opening 114 is provided to receive the threaded plug member 116 through which valve stem 118 extends for communication with the atmosphere.

Valve housing 100 is divided interiorly into the inlet chamber 120 and the outlet chamber 122 by means of the partition designated at 124. The inner partition 124 is comprised of the lower transverse section 126 and the vertically spaced section 128, with the entire partition 124 being spaced from the adjacent wall of housing 100 to define the inlet passage 120.

The vertical section 128 of the inner partition 124 terminates adjacent the undersurface of bonnet 102 and has its inner upper free end internally screw threaded in order to receive the valve seat ring member 130. Seat ring 130 is provided with the flange 132 to limit the extent which seat ring 130 may be threaded downwardly. Seat ring 130 is also provided with the upstanding bead 134 which constitutes a valve seat for the valve 136 in its normally seated position.

Axially slidable valve 136 is disposed within the inlet chamber 120, and is recessed on its underface to receive the composition washer member 138 which effects a tight seal between the inlet and outlet chambers when seated on the bead 134 of valve seat ring 130. Valve 136, as previously mentioned, is provided with the upstanding integral stem portion 118 having the grooves 140 adjacent its free end to receive a screw driver or other tool for manual test lifting of valve 136.

Valve 136 is capable of axial movement within the limits defined by the cut-out portion 142 of the bonnet section, and the surface 144 of valve 136 communicates with the atmosphere by means of the opening 145 between valve stem 118 and the plug insert 116. Coil spring 146 surrounds valve stem 118 within the area defined by the upper surface 144 of valve 136 and the underside of the insert member 116. It will be observed that the compression of spring 146 may be varied by varying the position of the insert plug 116 and by this means the temperature and pressure at which valve 136 will open can be varied.

Valve 136 has the polygonal guide member 148 secured to its undersurface by means of the threaded bolt 149. Guide 148 extends through the valve opening 150, which is provided medially of the valve seat ring 130 to permit discharge of fluid from inlet chamber 120 to the outlet chamber 122. The ribs of guide 148 are preferably spaced about 90° apart so as to provide a series of channels through which the fluid may pass from the inlet to the outlet chamber for discharge when valve 136 is raised.

The guide 148 has its lower surface abutting the upstanding boss member 152, which is integral with the temperature responsive bellows 154 disposed in the outlet chamber 122.

A second aligned opening 153 is provided in the transverse section 126 of the partition 124, so that the depending tubular extension 156 of the temperature responsive element can be extended into the inlet chamber. The temperature responsive bellows 154 with its associated tubular extension 156 is rigidly secured to the transverse section 126 of partition 124 by means of the lock nut 157 which is screw threaded to the upper threaded portion 158 of the tubular extension.

A fixed seal 160 is provided between the tubular extension 156 and the opening 153 in order to prevent leakage of fluid from the inlet chamber to the outlet chamber at this point. The packing seal 160 may be of any conventional material, but is here shown as a fixed O-ring member which is fitted within the groove 162 in the outer circumference of the tubular extension 156.

The operation of the modified valve represented by Figures 5 to 8 is substantially identical to the operation of the valve shown and described in connection with Figures 1 to 4, with the exception that the valve member 136 has its entire upper surface exposed to the atmosphere so that none of the system pressure is allowed to act on the upper surface of the valve 136. The area 164 on the undersurface of valve 136 is exposed to the system pressure and provides a pressure area, so that the valve may be lifted from its seat when the pressure in inlet chamber 120 reaches a sufficient degree to overcome the force of spring 146 tending to keep valve 136 seated. The axially slidable O-ring sealing member 143, in this modification, is fitted around the valve body instead of the valve stem as in the valve described in connection with Figures 1 to 4 in order to prevent leakage of fluid to the atmosphere through the valve bonnet.

In this modification spring 146 is relatively heavy, since a component of the system pressure is allowed to act on a segment of the undersurface of valve 136, so that the force of said spring will be partially balanced by the system pressure when in use. The seating force of spring 146 will be counteracted by the system pressure until the pressure reaches a sufficient point to entirely unseat valve 136. Severe embedding is thereby prevented.

When the valve 136 is lifted from its seat due to elevated temperature or pressure conditions, the fluid is discharged around the guide 148, through the opening 150, and over the temperature responsive bellows 154, and into outlet port 112 and waste pipe 165 shown in dotted lines in Figure 5.

In both modifications it will be observed that the upper opening which receives the valve seat ring is of sufficient diameter to permit the removal of the "Sylphon" bellows from the outlet chamber upon removal of the top bonnet portion, without removing the valve from the tank or system in connection with which it is employed.

Valve 136, stem 118 and the spring 146 are assembled in the bonnet portion along with the valve guide 148, and these parts are removed by the simple removal of the bonnet 102. When the parts are in their normally closed position, the fluid within tank 79 passes upwardly through the inlet port in the direction of the arrows in Figures 1 and 5 and completely fills the inlet chamber 120.

In both forms of the invention, means are provided for rendering an automatic or re-seating quick actuated relief valve in which replacement of all the working parts can be had without removing the valve from the fluid heating system with which it is connected, such as the tank 79, and which is simple, efficient and accurate in operation. Moreover, all of the thermal responsive element, with the exception of the tubular extension, is positioned within the outlet chamber so as not to be subjected to contact with foreign particles or corrosion which would cause the valve to stick or which might penetrate the necessarily thin bellows and cause the temperature element or thermostat to become inoperative. Additionally, means are provided to maintain the closure pressure exerted on the valve at a point just sufficient to effect sealing contact of the valve with its seat. The bellows is also positioned in the outlet chamber so as to act as a deflector for directing the excess heated fluid into the outlet port.

It will be understood that the forms of the invention shown and described are merely illustrative of preferred embodiments and that such changes may be made to the valve assembly as come within the scope of the appended claims.

We claim:

1. A relief valve comprising: a housing having an upper removable bonnet section and a lower casing section provided with a bottom inlet port, a lateral outlet port and an inner partition dividing the interior of said housing into an inlet chamber and an outlet chamber, said partition having an opening therethrough opposed to said bonnet section and providing communication between said inlet chamber and said outlet chamber, and said bonnet section having a bore therethrough aligned with said opening, the outer end of said bore being open to atmosphere; an upwardly-facing valve seat on the inlet side of said opening; a rigid valve assembly reciprocable in said inlet chamber for engagement with said seat, said assembly having a portion thereof slidably and sealingly engaged within said bonnet bore, the effective area of said valve assembly portion exposed to atmospheric pressure in said bore being substantially equal to the area encompassed by said valve seat; means yieldably urging said valve assembly into engagement with said seat; and a thermally-responsive element for lifting said valve assembly from said seat, said element including an expansible member disposed in said outlet chamber in alignment with said partition opening and a tubular extension fixedly and sealingly depending into said inlet chamber through an opening in said inner partition aligned with said first-mentioned opening.

2. A relief valve comprising: a housing divided by an interior partition wall into inlet and outlet chambers; means defining a passageway extending through said wall and providing communication between said chambers; a valve seat in said inlet chamber surrounding the corresponding end of said passageway; a reciprocable valve having at least a portion thereof disposed in said inlet chamber and cooperating with said seat; resilient means for normally maintaining said valve seated on said seat, the net surface area of said valve affected by fluid pressure in said inlet chamber to urge said valve to seat on or unseat from said seat being substantially zero; and a thermally-responsive element for lifting said valve from said seat, said element including an expansible member disposed in said outlet chamber in alignment with said passageway and a tubular extension fixedly and sealingly extending into said inlet chamber through an opening in said wall aligned with said passageway.

References Cited in the file of this patent

UNITED STATES PATENTS

| | | |
|---|---|---|
| 1,363,470 | Knudsen | Dec. 28, 1920 |
| 1,791,811 | Ciesler | Feb. 10, 1931 |
| 2,151,501 | Corcoran | Mar. 21, 1939 |
| 2,351,190 | Carlson | June 13, 1944 |
| 2,486,644 | Grosboll | Nov. 1, 1949 |
| 2,497,201 | Banner | Feb. 14, 1950 |
| 2,642,229 | Mueller et al. | June 16, 1953 |